US011995989B2

(12) United States Patent
Clark et al.

(10) Patent No.: US 11,995,989 B2
(45) Date of Patent: May 28, 2024

(54) VISUALIZATION OF PLANNED AUTONOMOUS VEHICLE BEHAVIOR

(71) Applicant: GM Cruise Holdings LLC, San Francisco, CA (US)

(72) Inventors: Brian Laurence Clark, San Francisco, CA (US); Michael Alan Huff, Emeryville, CA (US); Flavius Popescu, San Francisco, CA (US); Chad Lawrence Bettencourt, San Francisco, CA (US); Tejeswara Reddy Pogula, San Francisco, CA (US); Yuxi Zhang, San Mateo, CA (US); Jiajian Zhou, San Francisco, CA (US); Christophe Philippona, San Francisco, CA (US); Tal Benisty, San Francisco, CA (US); Myung Jin Kim, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 155 days.

(21) Appl. No.: 16/835,451

(22) Filed: Mar. 31, 2020

(65) Prior Publication Data

US 2021/0304608 A1    Sep. 30, 2021

(51) Int. Cl.
*G08G 1/16* (2006.01)
*B60W 50/14* (2020.01)
(Continued)

(52) U.S. Cl.
CPC ............. *G08G 1/163* (2013.01); *B60W 50/14* (2013.01); *B60W 60/0011* (2020.02);
(Continued)

(58) Field of Classification Search
CPC ...... G08G 1/163; G08G 1/0112; G08G 1/091; B60W 60/00272; B60W 60/0011; B60W 50/14
See application file for complete search history.

(56) References Cited

U.S. PATENT DOCUMENTS

| 11,040,729 B2 * | 6/2021 | Zhao ................. G01C 21/3407 |
| 2005/0099321 A1 * | 5/2005 | Pearce .................. G08G 1/123 |
| | | 340/995.13 |

(Continued)

OTHER PUBLICATIONS

P. Lindemann, T. Lee and G. Rigoll, "Supporting Driver Situation Awareness for Autonomous Urban Driving with an Augmented-Reality Windshield Display," 2018 IEEE International Symposium on Mixed and Augmented Reality Adjunct (ISMAR-Adjunct), 2018, pp. 358-363, doi: 10.1109/ISMAR-Adjunct.2018.00104. (Year: 2018).*

*Primary Examiner* — James J Lee
*Assistant Examiner* — Wenyuan Yang
(74) *Attorney, Agent, or Firm* — Michael DiCato

(57) ABSTRACT

To visualize planned behavior of an autonomous vehicle (AV) traveling along a roadway, a user interface engine receives data describing a planned pathway of the AV along the roadway and object data describing an object having a predicted pathway crossing the planned pathway of the AV at a cross point. The user interface engine classifies the object either an asserting object or a yielding object based on a prediction of whether the object reaches the cross point before the AV or after the AV. The user interface engine generates an image that includes the planned pathway of the AV and the object in the environment of the AV. The image of the object indicates whether the object is classified as an asserting object or a yielding object.

20 Claims, 7 Drawing Sheets

(51) Int. Cl.
  B60W 60/00 (2020.01)
  G08G 1/01 (2006.01)
  G08G 1/09 (2006.01)

(52) U.S. Cl.
  CPC ..... B60W 60/00272 (2020.02); G08G 1/0112 (2013.01); G08G 1/091 (2013.01); B60W 2050/146 (2013.01)

(56) References Cited

U.S. PATENT DOCUMENTS

| | | | |
|---|---|---|---|
| 2008/0088479 A1* | 4/2008 | Caminiti | G08G 1/096716 340/932 |
| 2016/0284215 A1* | 9/2016 | Ova | G08G 1/0129 |
| 2016/0364983 A1* | 12/2016 | Downs | G08G 1/096758 |
| 2017/0329332 A1* | 11/2017 | Pilarski | B60W 30/0956 |
| 2018/0066957 A1* | 3/2018 | Stroila | G01C 21/3446 |
| 2018/0261098 A1* | 9/2018 | Gupta | G08G 1/164 |
| 2019/0107840 A1* | 4/2019 | Green | G05D 1/0088 |
| 2019/0311621 A1* | 10/2019 | Pedersen | G08G 1/0962 |
| 2019/0354103 A1* | 11/2019 | Kuffner, Jr. | G08G 1/096791 |
| 2020/0174472 A1* | 6/2020 | Zhang | G06N 3/084 |
| 2020/0269875 A1* | 8/2020 | Wray | G01C 21/3407 |
| 2020/0338983 A1* | 10/2020 | Alalao | B60K 35/00 |
| 2021/0072892 A1* | 3/2021 | Lee | B60H 1/00985 |
| 2021/0284195 A1* | 9/2021 | Zhu | B60W 40/04 |
| 2021/0325892 A1* | 10/2021 | Nister | G05D 1/0231 |

* cited by examiner

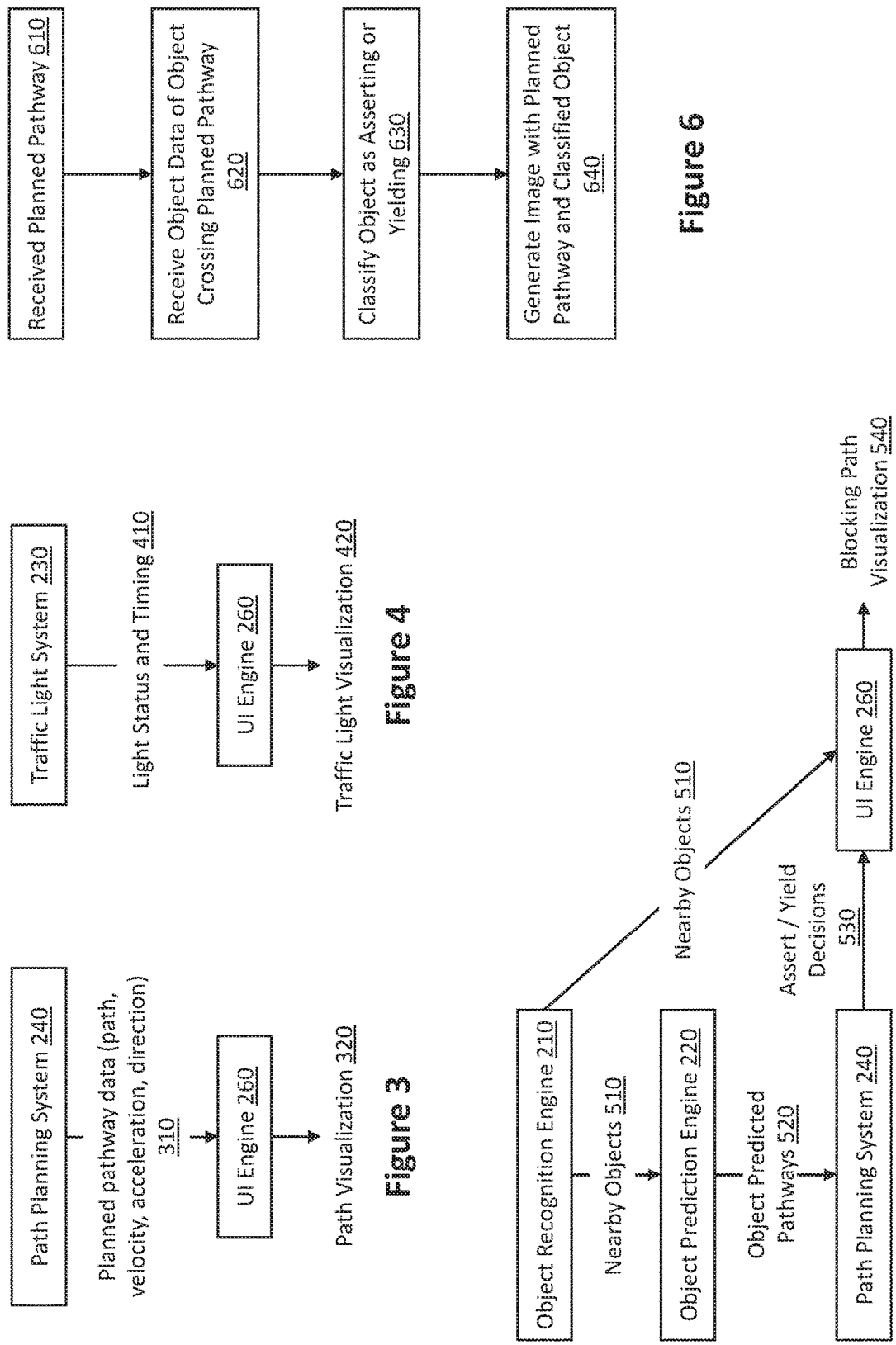

VISUALIZATION OF PLANNED AUTONOMOUS VEHICLE BEHAVIOR

TECHNICAL FIELD OF THE DISCLOSURE

The present disclosure relates generally to autonomous driving and, more specifically, to devices and methods for visualizing planned behavior of autonomous vehicles.

BACKGROUND

As autonomous vehicles (AVs) are being developed, human drivers ride in the AVs and are able to take over and manually override self-driving behavior. For example, if a human driver believes that the AV, operating in self-driving mode, may make an unsafe maneuver or cause an accident, the human driver can manually take over operation of the AV. Existing user interfaces provided to human drivers show information in the surroundings of the AV that the AV has identified, e.g., other vehicles and pedestrians, and the route that the AV plans to travel. However, current interfaces do not show planned behaviors of the AV relative to objects in the environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a flow diagram showing a process for path visualization according to some embodiments of the present disclosure;

FIG. 4 is a flow diagram showing a process for traffic light visualization according to some embodiments of the present disclosure;

FIG. 5 is a flowchart showing a process for blocking path visualization according to some embodiments of the present disclosure;

FIG. 6 is a flowchart showing a process performed by a UI engine to visualize planned behavior of the AV according to some embodiments of the present disclosure;

DESCRIPTION OF EXAMPLE EMBODIMENTS OF THE DISCLOSURE

Overview

Figure 1:
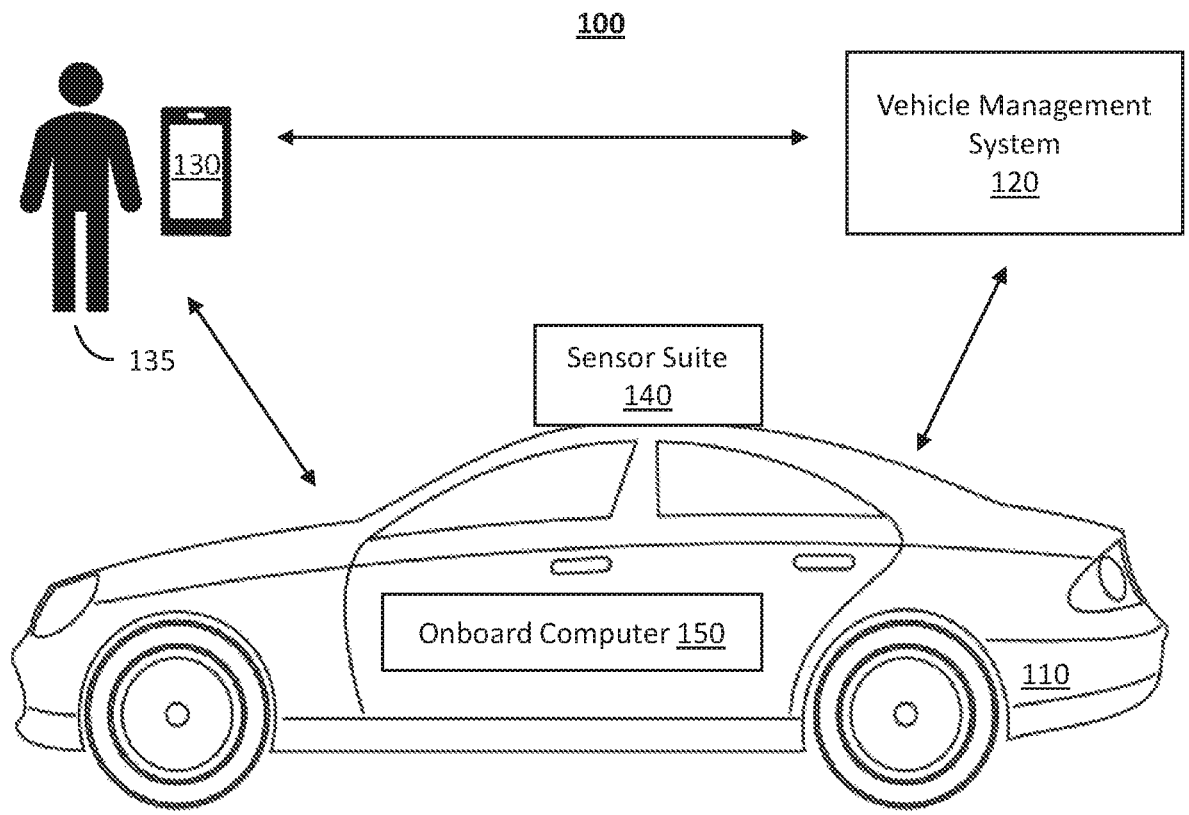
FIG. 1 is a block diagram illustrating a system including an example AV equipped for visualization of planned AV behavior according to some embodiments of the present disclosure may be implemented.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs are equipped to carry human drivers or riders. For example, as AV systems are being developed, tested, and improved, human safety drivers ride in the AVs and are able to take over and manually override self-driving behavior. If the safety driver believes that an AV operating in self-driving mode may make an unsafe maneuver, the human driver can manually take over operation of the AV. For example, the safety driver may see an object in the roadway, such as an oncoming vehicle, pedestrian, or traffic light, and believe that the AV may not have taken the object into account when planning its maneuvers. Current user interfaces provided to safety drivers show information describing the surroundings of the AV, e.g., other vehicles and pedestrians recognized by the AV, and may show the planned path of the AV along the nearby roadways. However, current interfaces do not provide much insight into the planned behaviors of the AV, such as when the AV plans to assert itself relative to other objects, or when the AV plans to yield to other objects. Because the safety driver lacks insight into the AV's planned behavior, the safety driver may manually override the AV's behavior unnecessarily.

Providing user interfaces that show more information about the AV's planned behaviors can show safety drivers that the AV has taken particular objects and conditions into account and thereby reduce manual overrides of the AV. Such user interfaces can also be provided to AV passengers in non-test settings. Like safety drivers during testing, AV passengers may observe the AV's surroundings and, without knowing the AV's planned behavior, may believe that the AV has not taken an object or condition into account when planning its maneuvers. Providing more information to passengers about the AV's planned behaviors can increase passengers' confidence in the autonomous driving system.

In some embodiments, a user interface device in the AV (e.g., a tablet or vehicle display screen) generates user interfaces that indicate whether the AV intends to yield to another object, or assert itself relative to the object. For example, the AV identifies an object, such as another vehicle or a pedestrian, that is predicted to cross the planned pathway of the AV. The user interface depicts the object with a visual coding indicating whether the AV plans to yield to the object (e.g., if the AV determines that the object has the right-of-way), or whether the AV plans to assert itself over the object (e.g., if the AV determines that it has the right-of-way).

In some embodiments, the user interface device generates user interfaces that show the planned velocities of the AV. For example, as the AV approaches an intersection, the intended pathway of the AV can be drawn in the user interface and color-coded to indicate whether the AV plans to slow down, speed up, or maintain its speed as it reaches the intersection. In some embodiments, the user interface device generates user interfaces that show a current status of a traffic light as the AV approaches the traffic light. The status may include a timer indicating the remaining duration of the status, e.g., the number of seconds left in a yellow light.

Embodiments of the present disclosure provide a method for visualizing planned behavior of an AV, and a computer-readable medium for performing the method. The method includes receiving data describing a planned pathway of the AV along a roadway, receiving object data describing an object in an environment of the AV, where the object data includes a predicted pathway of the object, and the predicted pathway is predicted to cross the planned pathway of the AV at a cross point. The method further includes classifying the object as one of an asserting object and a yielding object based on whether the predicted pathway and the planned pathway indicate that the object is predicted to reach the cross point before the AV or after the AV, and generating an image including the planned pathway of the AV and the object in the environment of the AV, where the image of the object indicates whether the object is classified as an asserting object or a yielding object.

Embodiments of the present disclosure provide a system for visualizing planned behavior of an AV. The system includes a path planning system, and object prediction engine, and a user interface engine. The path planning system is configured to generate a planned pathway of the AV along a roadway. The object prediction engine is configured to generate a predicted pathway of an object in an environment of the AV, the predicted pathway crossing the planned pathway of the AV at a cross point. The user interface engine is configured to classify the object as one of an asserting object and a yielding object based on a prediction of whether the object reaches the cross point before the AV or after the AV. The user interface engine is further configured to generate an image comprising the planned pathway of the AV and the object in the environment of the AV, where the image of the object indicates whether the object is classified as an asserting object or a yielding object.

As will be appreciated by one skilled in the art, aspects of the present disclosure, in particular aspects of visualizing planned behavior of an AV, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Further-more, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Configured for Visualization of Planned Behavior

FIG. 1 is a block diagram illustrating a system 100 including an example AV in which visualizing planned behavior of an AV according to some embodiments of the present disclosure may be implemented. The system 100 includes an autonomous vehicle (AV) 110, a vehicle management system 120, and a user device 130. The AV 110 includes a sensor suite 140 and an onboard computer 150. The system 100 enables the AV 110 to visualize its planned behavior to the user 135 of the user device 130. In one embodiment, the user 135 is a safety driver who rides in the AV during testing and can manually override the AV behavior. In some embodiments, two safety drivers are present: a first driver who can control the AV (e.g., has access to the steering wheel, brake pedal, and gas pedal), and a second driver who interacts with the user device 130 and provides spoken information to the first driver. In another embodiment, the user 135 is a passenger riding in the AV; the passenger may or may not be able to manually override AV behavior.

The user device 130 may be mounted in the AV 110, e.g., as a display screen or touchscreen mounted in the dashboard, or a tablet mounted in the AV 110. In such embodiments, the user device 130 may include one or more interfaces for the user to view information and adjust settings relating to the AV 110, such as route information and settings, temperature settings, music selections, etc. The user device 130 is configured to generate displays showing the planned behavior of the AV 110 to the user 135.

Alternatively, the user device 130 may be a personal device of the user 135, e.g., a smartphone, tablet, computer, or other device for interfacing with a user (e.g., a passenger) of the AV 110. The user device 130 may provide one or more applications (e.g., mobile device apps, browser-based apps) with which a user can interface with a service that provides or uses AVs, such as a service that provides rides to users in AVs. The service, and particularly the AVs associated with the service, is managed by the vehicle management system 120, which may also provide the application to the user device 130. The application may provide an interface to passengers during their rides; the interface may include a display that shows the planned behavior of the AV 110.

In still other embodiments, the user device 130 may be a user device provided to a safety driver for use during testing of the AV 110. AV testing may be managed by the vehicle management system 120, and the user device 130 may be a tablet issued by the vehicle management system 120 to the safety driver for use during testing. The user device 130 may provide testing instructions to the safety driver and information about the AV 110, including displays showing the planned behavior of the AV 110.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. The onboard computer 150 and user device 130 generate a user interface that shows the planned behavior of the AV 110. The onboard computer 150 is described further in relation to FIG. 2. The generation of user interfaces is described in relation to FIGS. 3-8, and example user interfaces are shown in FIGS. 9-16.

During a testing stage, the vehicle management system 120 may manage the testing of a fleet of AVs, including AV 110. During operation, the vehicle management system 120 may manage a fleet of AVs. For example, the vehicle management system 120 may provide and update AV software, including instructions for generating user interfaces showing the planned behavior of AVs. If the vehicle management system 120 manages a fleet of AVs that provide ride services, the vehicle management system 120 may select an AV from a fleet of AVs, and instruct the selected AV (e.g., AV 110) to provide rides to users, such as user 135.

As shown in FIG. 1, the user device 130 communicates with the vehicle management system 120. The user device 130 and vehicle management system 120 may connect over a public network, such as the Internet. The vehicle management system 120 also connects to the AV 110, e.g., over the Internet. The user device 130 can communicate with the AV 110 over a wired or wireless connection, e.g., over the Internet or a local connection, such as Bluetooth.

Example Onboard Computer

Figure 2:
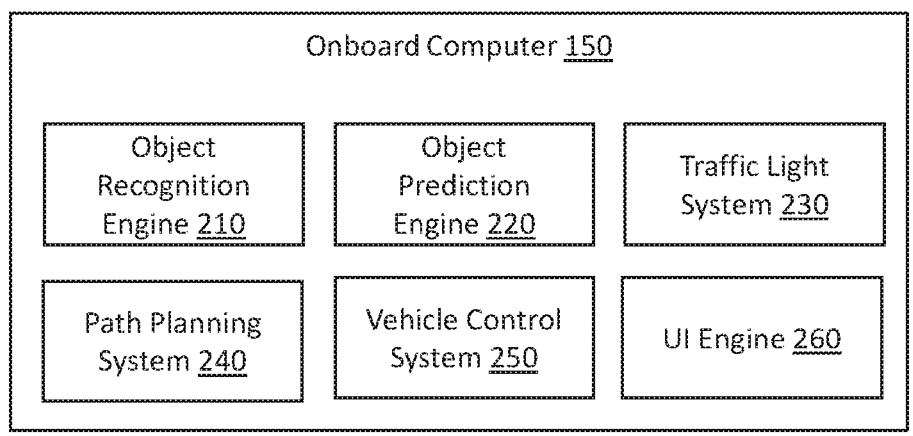
FIG. 2 is a block diagram illustrating an onboard computer according to some embodiments of the present disclosure.

FIG. 2 is a block diagram illustrating the onboard computer 150 according to some embodiments of the present disclosure. The onboard computer 150 includes an object recognition engine 210, an object prediction engine 220, a traffic light system 230, a path planning system 240, a vehicle control system 250, and a UI engine 260. In alternative configurations, fewer, different and/or additional components may be included in the onboard computer 150. For example, in some configurations, the UI engine 260 is included in the user device 130 rather than the onboard computer 150, or some functions of the UI engine 260 are performed by the user device 130. Further, functionality attributed to one component of the onboard computer 150 may be accomplished by a different component included in the onboard computer 150 or a different system than those illustrated.

The object recognition engine 210 identifies objects in the environment of the AV 110. The sensor suite 140 produces a data set that is processed by the object recognition engine 210 to detect other cars, pedestrians, trees, bicycles, and objects within a road on which the AV 110 is traveling (such as construction and/or other objects that may impede movement of the vehicle), and indications surrounding the AV 110 (such as construction signs, traffic lights, stop indicators, and other street signs). For example, the data set from the sensor suite 140 may include images obtained by cameras, point clouds obtained by lidar (light detecting and ranging) sensors, and data collected by radar sensors. The object recognition engine 210 may include one or more classifiers trained using machine learning to identify particular objects. For example, a multi-class classifier may be used to determine whether each object in the environment of the AV 110 is one of a set of potential objects, e.g., a vehicle, a pedestrian, or a bicyclist. As another example, a pedestrian classifier recognizes pedestrians in the environment of the AV 110, a vehicle classifier recognizes vehicles in the environment of the AV 110, etc.

The object prediction engine 220 predicts future pathways for certain types of objects identified by the object recognition engine 210. In particular, the object prediction engine 220 predicts one or more predicted pathways for objects that are moving or are able to move, e.g., other vehicles, pedestrians, bicycles, animals, etc. For example, for a vehicle approaching an intersection, the object prediction engine 220 predicts a pathway for the vehicle based on the lane in which the vehicle is traveling (e.g., a left turn lane), any vehicle turn indicators (e.g., the left turn indicator), the speed of the vehicle (e.g., whether the vehicle is slowing down to make a turn), right-of-way rules or conventions, or other factors.

As another example, for a pedestrian, the object prediction engine 220 may determine a predicted pathway for the pedestrian based on the prior pathway of the pedestrian, including direction and speed of the pedestrian's movement; the direction the pedestrian is currently facing; the behavior of the pedestrian, e.g., waiting at a crosswalk; the environment of the pedestrian, e.g., pedestrian crossings, physical barriers, the behavior of other objects in the environment, status of walk/don't walk signs, etc.; or other factors. The object prediction engine 220 may determine multiple predicted pathways, e.g., if the pedestrian could continue walking down a sidewalk, turn down another street, or walk into the street. The object prediction engine 220 may determine a statistical likelihood for each predicted pathway. The object prediction engine 220 may determine a predicted velocity or velocity profile for the predicted pathway, e.g., the object prediction engine 220 may predict that the pedestrian walks 4 mph, or may predict the pedestrian to be located within a particular area 5 seconds from the current time. Similarly, the object prediction engine 220 may determine predicted pathways for other types of objects.

The traffic light system 230 determines a status of any traffic lights in the environment of the AV 110. The traffic light system 230 may receive data from the sensor suite 140 which the traffic light system 230 can use to recognize traffic lights in the environment of the AV 110, or the traffic light system 230 may receive data about a traffic light identified by the object recognition engine 210. The traffic light system 230 determines the current state of the traffic light, i.e., which light (e.g., green, yellow, or red) or lights (e.g., red with green left turn arrow) of the traffic light are currently on, based on images of the traffic light captured by the sensor suite 140. The traffic light system 230 may also determine a predicted remaining duration of the current state of the traffic light. For example, the traffic light system 230 may access traffic light data describing the timing of the traffic light, e.g., data indicating that yellow lights in the current municipality in which the AV 110 is located have a duration of 4 seconds; data indicating that, at this time of day, this traffic light is green for 30 seconds; etc. The traffic light data may be determined based on observations collected by a fleet of AVs.

The path planning system 240 plans a path for the AV 110 based on data received from the object recognition engine 210, the object prediction engine 220, and the traffic light system 230. In some embodiments, the path planning system 240 also receives navigation information, e.g., a description of a planned route, or the address of a destination. The path planning system 240 may receive additional data, e.g., additional signals from the sensor suite 140, data provided by the user 135 via the user device 130, and data from the vehicle management system 120. The path planning system 240 determines a planned pathway for the AV 110 to follow by applying path planning rules or models to the received data. When objects are present in the environment of the AV 110, the path planning system 240 determines the planned pathway for the AV 110 based on predicted pathways of the objects and right-of-way rules that regulate behavior of vehicles, bicycles, pedestrians, or other objects.

The planned pathway includes locations for the AV 110 to maneuver to, and timing and/or speed of the AV 110 in maneuvering to the locations. For example, the planned pathway includes a series of points along the roadway and a corresponding set of velocities, where the AV 110 plans to travel at a given velocity when the AV 110 crosses the corresponding point. The planned pathway may further or alternatively include acceleration data, e.g., a planned acceleration or deceleration rate at points along the planned pathway; timing data, e.g., a time that the AV 110 reaches each point along the planned pathway; and direction data, e.g., a direction that the AV 110 is heading at each point along the planned pathway.

The path planning system 240 may determine a planned pathway for a particular time or distance, e.g., the path planning system 240 may plan the next 10 seconds or 20 seconds of maneuvers, or the path planning system 240 may plan the next 10 meters or 30 meters of the planned pathway. The time or distance for which the path planning system 240 determines a planned pathway may depend on context, e.g., for an AV 110 traveling at a higher speed, the path planning system 240 may plan a longer path (e.g., the path planning system 240 plans the next 100 meters if the AV 110 is traveling on a highway) than for an AV 110 traveling at a lower speed (e.g., the path planning system 240 plans the next 10 meters if the AV 110 is traveling on a busy city street). The path planning system 240 continually updates the planned pathway based on the movements of the AV 110 and new data received from the object recognition engine 210, object prediction engine 220, traffic light system 230, and other sources.

The vehicle control system 250 instructs the movement-related subsystems of the AV 110 to maneuver according to the planned pathway provided by the path planning system 240. The vehicle control system 250 may include the throttle interface for controlling the engine throttle, motor speed (e.g., rotational speed of electric motor), or any other movement-enabling mechanism; the brake interface for controlling the brakes of the AV 110 (or any other movement-retarding mechanism); and the steering interface for controlling steering of the AV 110 (e.g., by changing the angle of wheels of the AV).

The UI engine 260 generates a graphical user interface (GUI) that displays the planned pathway to a user on a screen of the user device 130. The UI engine 260 receives data from other components of the onboard computer 150, e.g., data from the object recognition engine 210 describing objects in the local environment of the AV 110, data from the traffic light system 230 describing traffic light status and timing, and data from the path planning system 240 describing the planned pathway of the AV 110. The GUI includes a visual representation of at least a portion of the environment of the AV 110 and at least a portion of the planned pathway of the AV 110. In addition, the GUI includes visual representations of the planned behavior of the AV 110, e.g., whether the AV 110 plans to yield to another object, planned velocities for the AV 110, and expected traffic light behavior. Example displays generated by the UI engine 260 are shown in FIGS. 9-16.

In some embodiments, the UI engine 260 transmits signals for generating the GUI to the user device 130, which displays the GUI to the user. In other embodiments, the UI engine 260 is implemented by the user device 130, e.g., by an app provided by the vehicle management system 120 and executing on the user device 130.

Example Methods for Visualizing Planned Behavior

FIG. 3 is a flow diagram showing a process for path visualization according to some embodiments of the present disclosure. The path planning system 240 determines planned pathway data 310. The planned pathway data includes path data describing the shape and location of the path along the roadway. For example, the path data is described as a set of points along a centerline of the planned pathway of the AV 110. The planned pathway data also includes velocity data describing the planned velocity of the AV 110 along the pathway. For example, the velocity data is described as a set of velocities corresponding to the set of points in the path data. The planned pathway data may include other types of data, such as the acceleration of the AV 110 at various points along the planned pathway, and the direction that the AV 110 is facing at various points along the planned pathway. In some embodiments, the UI engine 260 derives some or all of the planned pathway data 310 from other data provided by the path planning system 240, e.g., the UI engine 260 derives the velocity data from acceleration data provided by the path planning system 240. In some embodiments, the UI engine 260 receives velocity data and acceleration data from the path planning system 240.

The UI engine 260 receives the planned pathway data 310 and generates a path visualization 320 of the planned pathway. The path visualization 320 may include a visual representation of the planned pathway in space, e.g., an image showing the centerline of the planned pathway along a visual representation of the roadway along which the AV 110 is traveling. The path visualization 320 may also include visual representations of additional planned pathway data, e.g., velocity or direction of the AV 110. In one example, the path visualization 320 is color-coded by velocity, such that a color at a point along the visual representation of the planned pathway indicates a velocity at the corresponding point along the planned pathway. For example, the path visualization 320 may have a velocity gradient in which the color red indicates that the AV 110 is stopped, the color green indicates that the AV 110 plans to travel above a threshold speed (e.g., above 20 miles per hour), and colors in between red and green indicate that the AV 110 plans to travel at a speed between 0 and 20 mph, e.g., yellow indicates that the AV 110 plans to travel at 5 mph. In other embodiments, the color-coding includes shading, e.g., with a lighter shade representing a faster speed and a darker shade representing a slower speed, or vice versa. The speeds to which colors correspond may vary based on context. For example, green may represent the speed limit of the roadway, so that on a highway, green indicates that the AV 110 plans to travel at 65 mph or higher, and on a city road, green indicates that the AV 110 plans to travel at 25 mph or higher.

The path visualization 320 may include additional or alternative information. For example, the path visualization 320 may include arrows indicating the direction of the AV 110 at various points along the pathway. As another example, the path visualization 320 includes an acceleration gradient in which colors indicate acceleration and deceleration rates. For example, red indicates that the AV 110 plans to decelerate, and green indicates that the AV 110 plans to accelerate. The color or brightness may indicate magnitude of acceleration or deceleration, e.g., a brighter red may indicate faster deceleration.

FIG. 4 is a flow diagram showing a process for traffic light visualization according to some embodiments of the present disclosure. The traffic light system 230 determines the light status and timing 410, which includes the current status of a traffic light that the AV 110 is approaching, and the predicted amount of time before the status of the traffic light changes. The UI engine 260 receives the light status and timing 410 and generates a traffic light visualization 420. The traffic light visualization 420 may be, for example, an image of a traffic light with the current status shown, or a single image of a light showing the current color or status (e.g., a yellow light if the current status is yellow, or a green left turn arrow if the current status is a green left turn arrow). The traffic light visualization 420 may also include a timer showing the predicted amount of time before the status of the traffic light changes. The timer may only be displayed for certain traffic light statuses, e.g., for yellow lights, or for yellow lights and turning lights (left arrows and right arrows). The timer may be, for example, depicted on top of an icon of the current light or status, beside the icon of the current light or status, or embedded into the icon, e.g., a yellow light may gradually change from yellow to black like a dial.

FIG. 5 is a flowchart showing a process for blocking path visualization according to some embodiments of the present disclosure. A blocking path is a potential path of an object that crosses, and may block, the path of the AV 110. When confronting a blocking path, the AV 110 may decide to yield to the object, e.g., if the object has the right-of-way, or the AV 110 may decide to assert over the object, e.g., if the AV 110 has the right-of-way.

The object recognition engine 210 identifies nearby objects 510 in the environment of the AV 110. For example, the object recognition engine 210 identifies objects that are in motion or have the potential to be in motion, such as vehicles, pedestrians, bicyclists, scooters, animals, etc. For each of the nearby objects 510 that may move, the object prediction engine 220 determines one or more object predicted pathways 520. As described in relation to FIG. 2, the object predicted pathways 520 may include predicted location data, predicted velocity data, and statistical likelihoods of various predicted pathways.

Figure 8:
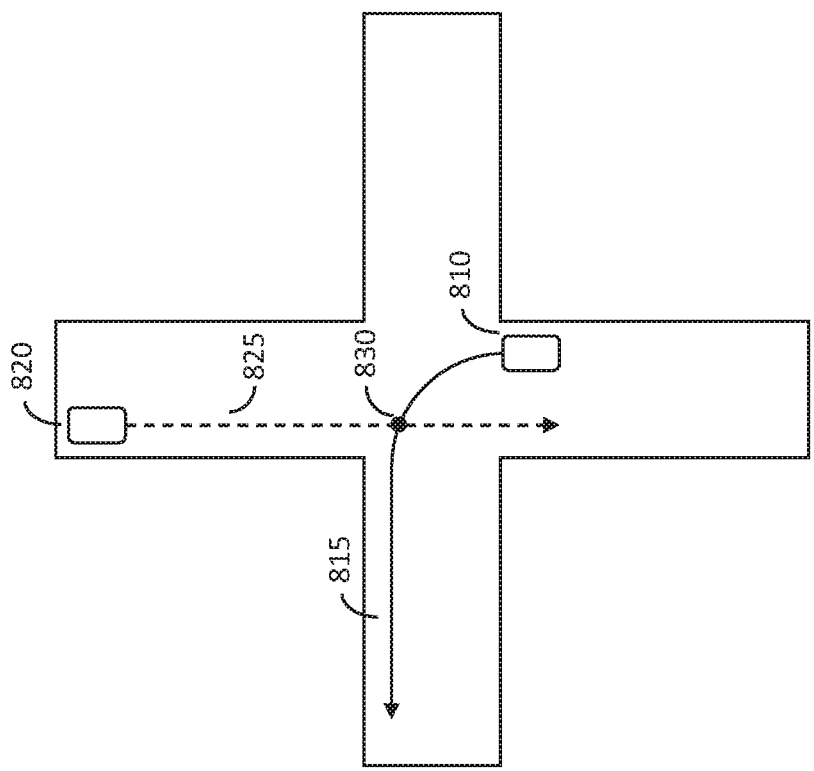
FIG. 8 illustrates a second example blocking path of a vehicle according to some embodiments of the present disclosure.
Figure 7:
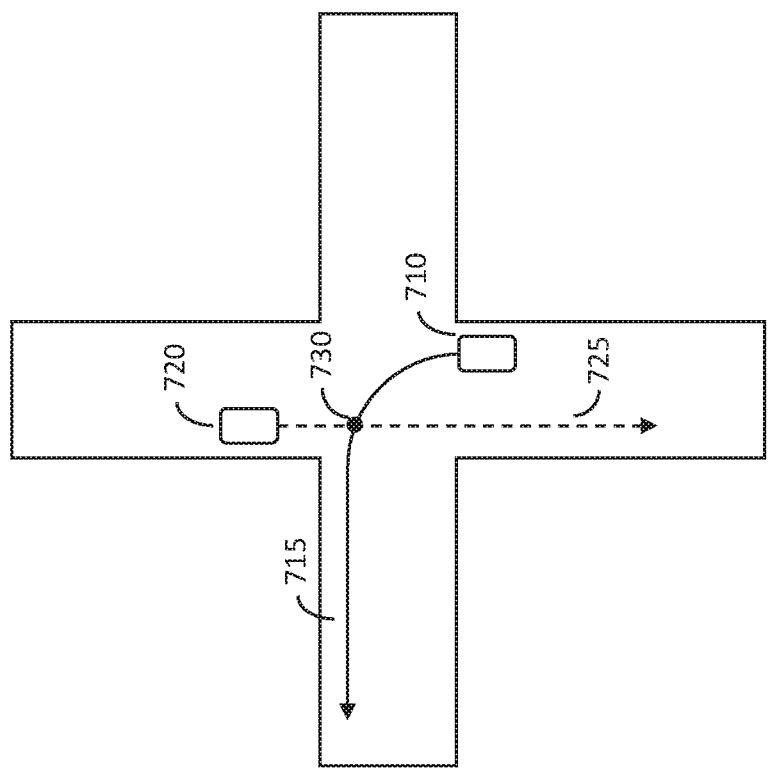
FIG. 7 illustrates a first example blocking path of a vehicle according to some embodiments of the present disclosure.

The path planning system 240 receives the object predicted pathways 520 and generates assert/yield decisions 530 for the AV 110 for each object that has a blocking path, or potentially blocking path, relative to the AV 110. In particular, the path planning system 240 identifies an object having a predicted pathway that is predicted to cross the planned pathway of the AV 110 at a cross point. The path planning system 240 compares the object predicted pathway 520 to the planned pathway of the AV 110 and determines if the object is predicted to reach the cross point before the AV 110 or after the AV 110. If the object is predicted to reach the cross point first, the object is classified as an asserting object, meaning that the object asserts itself over the AV 110. If the AV 110 is predicted to reach the cross point first, the object is classified as a yielding object, meaning that the object yields to the AV 110. In some cases, the prediction of whether the AV 110 or the object reaches the cross point first is based on rules that regulate the flow of vehicular and pedestrian traffic, such as traffic signals (e.g., traffic lights, stop signs, yield signs) and right-of-way rules and conventions (e.g., left turn yield on green, yield to a pedestrian at a crosswalk). In some cases, the prediction of whether the AV 110 or the object reaches the cross point first is based on the respective locations and speeds of the object and AV 110, e.g., whether the AV 110 or object reaches the intersection first at a four-way stop. FIGS. 7 and 8 show two examples of blocking path analysis.

The UI engine 260 receives the assert/yield decision 530 and generates a blocking path visualization 540 for display in the GUI. A blocking path visualization 540 indicates whether an object is classified as an asserting object or a yielding object. The object can be represented as an asserting object or a yielding object using a visual characteristic, e.g., an asserting object may be shown in a first color (e.g., red), and a yielding object may be shown in a second color (e.g., green). Different visual characteristics, such as highlighting, texture, patterns, etc. may be used to distinguish asserting and yielding objects from each other, and from other objects in the environment of the AV 110. In some embodiments, one or more predicted pathways of the object are shown, and the classification of asserting or yielding may be represented in the predicted pathway (e.g., color-coding the pathway as asserting or yielding). If there are multiple objects having blocking paths, the UI engine 260 may select a subset of the objects for which to provide a blocking path visualization 540, e.g., the object with the cross point nearest to the AV 110, or the object that is currently closest to the AV 110.

FIG. 6 is a flowchart showing a process performed by a UI engine, e.g., UI engine 260, to visualize planned behavior of an AV according to some embodiments of the present disclosure. The UI engine 260 receives 610 data describing the planned pathway of an AV 110 along a roadway, e.g., the planned pathway 310 generated by the path planning system 240. The UI engine 260 also receives 620 data describing an object in the environment of the AV 110. For example, the UI engine 260 receives data describing one or more nearby objects 510, such as object location and object type (e.g., car, pedestrian, bicycle, truck, etc.). The nearby object may be associated with a predicted pathway, e.g., an object predicted pathway 520 generated by the object prediction engine 220, that is predicted to cross the planned pathway of the AV 110.

The UI engine 260 classifies 630 the object as an asserting object or a yielding object. The UI engine 260 classifies the object based on a prediction of whether the object reaches the cross point before the AV or after the AV. The path planning system 240 and/or the object prediction engine 220 may predict whether the object reaches the cross point before or after the AV 110, and include this prediction in the object data received by the UI engine 260. For example, the path planning system 240 identifies a rule for regulating the flow of traffic that governs the predicted pathway and the planned pathway. The path planning system 240 predicts whether the object reaches the cross point before the AV 110 or after the AV 110 by applying the identified rule to the predicted pathway of the object and the planned pathway of the AV 110. In this embodiment, object data received by the UI engine 260 indicates whether the object is an asserting object or a yielding object.

In another embodiment, the UI engine 260 classifies the object as asserting or yielding based on timing data for the predicted pathway of the object and the planned pathway of the AV 110. For example, the object data includes predicted timing data describing timing for the object to travel along the predicted pathway (e.g., predicted speed data, or times at which the object is predicted to reach various points). The predicted timing data may be generated by the object prediction engine 220. The planned pathway includes planned timing data along the planned pathway for the AV 110 (e.g., planned velocity data, or times at which the AV 110 is planned to reach various points along the planned pathway) generated by the path planning system 240. The UI engine 260 classifies the object as asserting or yielding based on whether the predicted timing data and the planned timing data indicates that the object or the AV 110 is expected to reach the cross point first.

The UI engine 260 generates 640 an image that includes the planned pathway of the AV 110 and the classified object. The image of the object indicates whether the object is classified as an asserting object or a yielding object. For example, an asserting object has one visual characteristic, such as a particular color, pattern, size, or shape, and a yielding object has another visual characteristic, such as a particular color, pattern, size, or shape that is different from the visual characteristic of the asserting object.

The process shown in FIG. 6 may be performed at regular time intervals (e.g., every second, every tenth of a second, etc.), and the UI engine 260 updates the image accordingly. In some embodiments, a subset of the steps shown in FIG. 6 may be performed at a given time, e.g., if the planned pathway 240 has not changed during the prior time interval, the UI engine 260 may not receive 610 the planned pathway. The process shown in FIG. 6 may additionally or alternatively performed in response to changes to conditions, e.g., in response to the AV 110 moving by a certain amount (e.g., 1 meter or more from the prior image), in response to the path planning system 240 updating the planned pathway, in response to the object recognition engine 210 recognizing additional objects in the environment of the AV 110, or in response to the object prediction engine 220 updating a predicted pathway of an object.

As one example, the UI engine 260 receives updated object data including an updated predicted pathway for an object, e.g., based on the object not following its previously predicted pathway. Based on the updated object data, the UI engine 260 revises the classification of the object as an asserting object or a yielding object. For example, the object moved faster than initially predicted, and revised predicted timing data for the object changes the classification of the object from a yielding object to an asserting object. As another example, a traffic light change (e.g., yellow to red) changes the application of a rule governing the flow of traffic at a traffic light, and in response to the light change, the object prediction engine 220 reclassifies the object and updates the object data. The UI engine 260 updates the image of the object to reflect its revised classification.

FIG. 7 illustrates a first example blocking path of a vehicle according to some embodiments of the present disclosure. FIG. 7 shows an AV 710 that is traveling toward an intersection, and an object 720, which is a vehicle traveling toward the same intersection in the opposite direction of the AV 710. The AV 710 has a planned pathway 715 turning left through the intersection, and the object 720 has a predicted pathway 725 proceeding straight through the intersection. The planned pathway 715 and the predicted pathway 725 intersect at a cross point 730. In this example, the path planning system 240 determines that the object 720 is expected to reach the cross point 730 first, e.g., because the object 720 has the right-of-way (e.g., the traffic light system 230 determines that both the AV 710 and the object 720 have green lights) and the AV 710 cannot cross the cross point 730 before the object 720 reaches the cross point 730.

FIG. 8 illustrates a second example blocking path of a vehicle according to some embodiments of the present disclosure. FIG. 8 shows an AV 810 that is traveling toward an intersection, and an object 820, which is a vehicle traveling toward the same intersection in the opposite direction of the AV 810. The object 820 is farther from the intersection than object 720 in FIG. 7. The AV 810 has a planned pathway 815 turning left through the intersection, and the object 820 has a predicted pathway 825 proceeding straight through the intersection. The planned pathway 815 and the predicted pathway 825 intersect at a cross point 830. In this example, the path planning system 240 determines that the AV 810 may proceed through the intersection and cross the cross point 830 before the object 820, e.g., because the AV 810 can cross the cross point 830 before the object 820 reaches the cross point 830, or because the AV 810 has the right-of-way (e.g., the traffic light system 230 determines that the AV 810 has a green arrow).

Example User Interfaces

Figure 9:
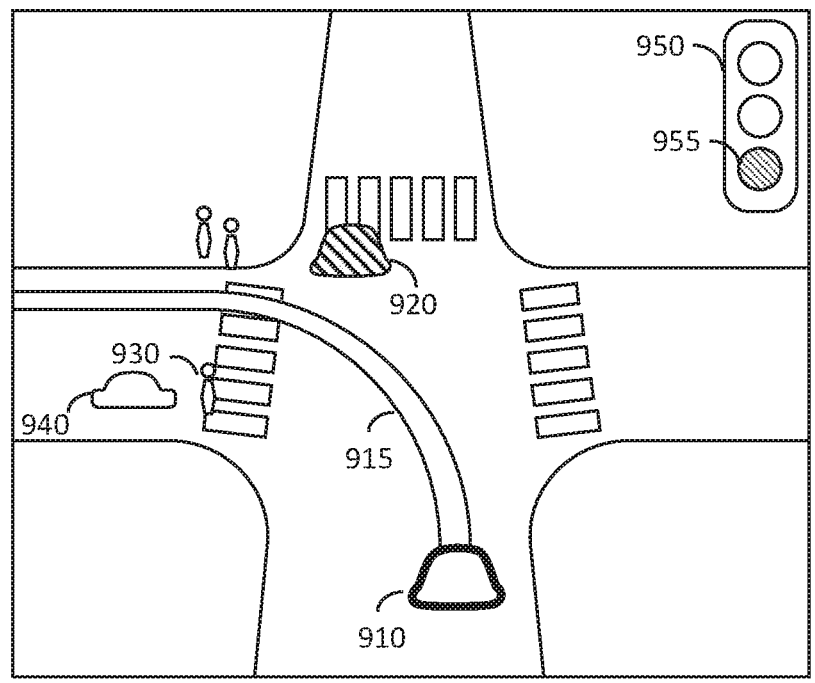
FIG. 9 is an example user interface illustrating visual coding of an asserting vehicle according to some embodiments of the present disclosure.

FIG. 9 is an example user interface illustrating visual coding of an asserting vehicle according to some embodiments of the present disclosure. The user interface includes an image 910 of the AV 110 traveling along a roadway toward an intersection. The user interface includes an image of the planned pathway 915 of the AV 110; the planned pathway image 915 indicates that the AV 110 plans to turn left at the intersection. Images of several objects in the environment of the AV 110 are also shown in the user interface. For example, an image of an oncoming car 920, an image of a pedestrian 930 crossing a crosswalk, and an image of a car 940 approaching the intersection from the left are shown. The user interface also includes a traffic light status indicator 950, which is a depiction of a traffic light that highlights the current status of the traffic light, here by coloring the green light 955. The green light 955 may be colored in green while the other lights are grayed out, or the green light 955 may be visually highlighted in another way, e.g., by making the green light 955 brighter than the red and yellow lights, by making the green light 955 larger than the red and yellow lights, etc.

This example user interface corresponds to the blocking path shown in FIG. 7, in which the oncoming car 720 is an asserting object, i.e., the oncoming car is expected to proceed through the intersection before the AV 110, and the AV 110 plans to yield to the oncoming car. In this example, the image of the oncoming car 920 is visually distinguished from the other objects, here with a diagonal line pattern, to indicate that the oncoming car is an asserting object. The image of the oncoming car 920 may be visually distinguished in other ways, e.g., by highlighting it with a different color, a glow, a different pattern, etc.

Figure 10:
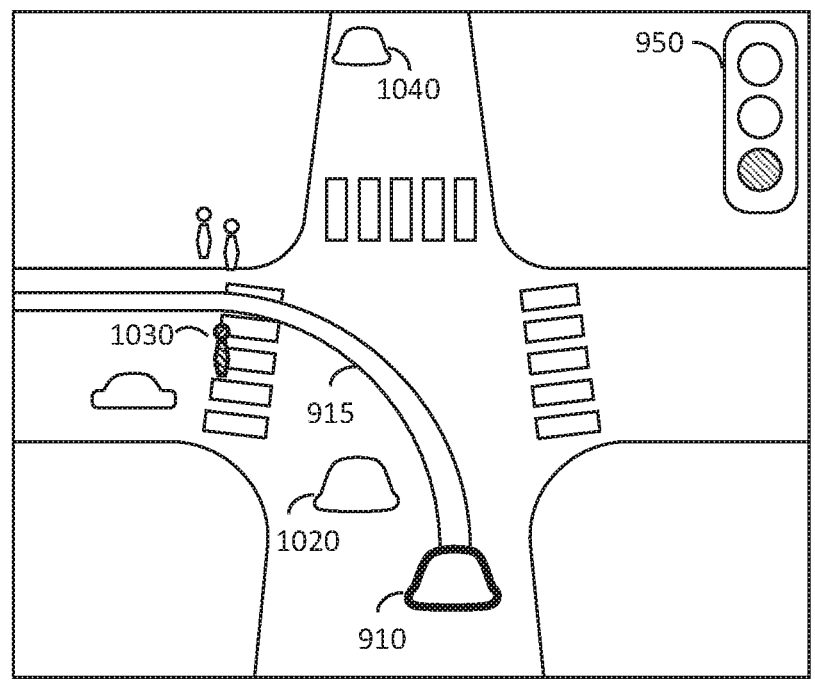
FIG. 10 is an example user interface illustrating visual coding of an asserting pedestrian according to some embodiments of the present disclosure.

FIG. 10 is an example user interface illustrating visual coding of an asserting pedestrian according to some embodiments of the present disclosure. The user interface shown in FIG. 10 shows the environment and planned behavior of the AV 110 a few seconds after the user interface shown in FIG. 9. The user interface in FIG. 10 includes the image 910 of the AV 110 and the image of the planned pathway 915 of the AV 110; the position of the AV 110 and the planned pathway 915 have not changed from FIG. 9. The oncoming car 920 has now passed the intersection and is now represented by image 1020, which is no longer visually classified as an asserting object. An image of another oncoming car 1040 approaching the intersection is now included in the user interface. The user interface shows the traffic light status indicator 950, which has not changed from FIG. 9.

The pedestrian 930 crossing at the crosswalk has now moved a few feet in the direction of the planned pathway 915 and is now represented by pedestrian image 1030, which is visually characterized as an asserting object. In this example, the AV 110 is now yielding to the pedestrian 1030, preventing the AV 110 from continuing through the intersection until the pedestrian 1030 has passed.

Figure 11:
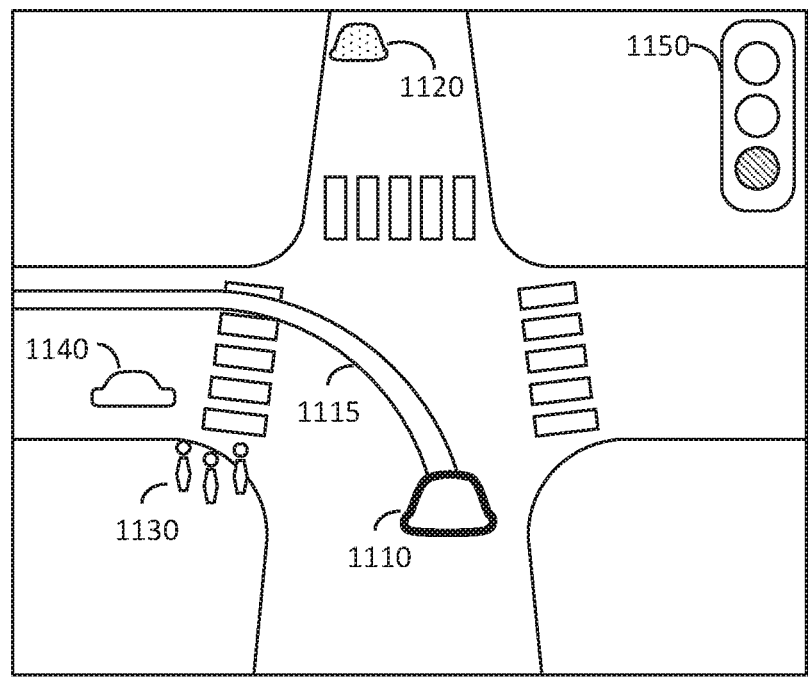
FIG. 11 is an example user interface illustrating visual coding of a yielding vehicle according to some embodiments of the present disclosure.

FIG. 11 is an example user interface illustrating visual coding of a yielding vehicle according to some embodiments of the present disclosure. The user interface includes an image 1110 of an AV 110 traveling along a roadway toward an intersection, an image of a planned pathway 1115 indicating that the AV 110 plans to turn left at the intersection, and images of several objects in the environment of the AV 110. For example, an image of an oncoming car 1120, images of pedestrians 1130 waiting to cross a crosswalk, and an image of a car 1140 approaching the intersection from the left are shown. The user interface also includes a traffic light status indicator 1150, which indicates that the AV 110 has a green light.

This example user interface corresponds to the blocking path shown in FIG. 8, in which the oncoming car 820 is a yielding object, i.e., the AV 110 plans to assert over the oncoming car and proceed through the intersection before the oncoming car. In this example, the image of the oncoming car 1120 is visually distinguished from the other objects, here with a dot pattern. This pattern in the image of the oncoming car 1120 is different from the patterns on the objects 920 and 1030; the dot pattern indicates that the oncoming car 1120 is a yielding object. The image of the oncoming car 1120 may be visually distinguished in other ways, e.g., by highlighting it with a different color, a glow, a different pattern, etc.

Figure 12:
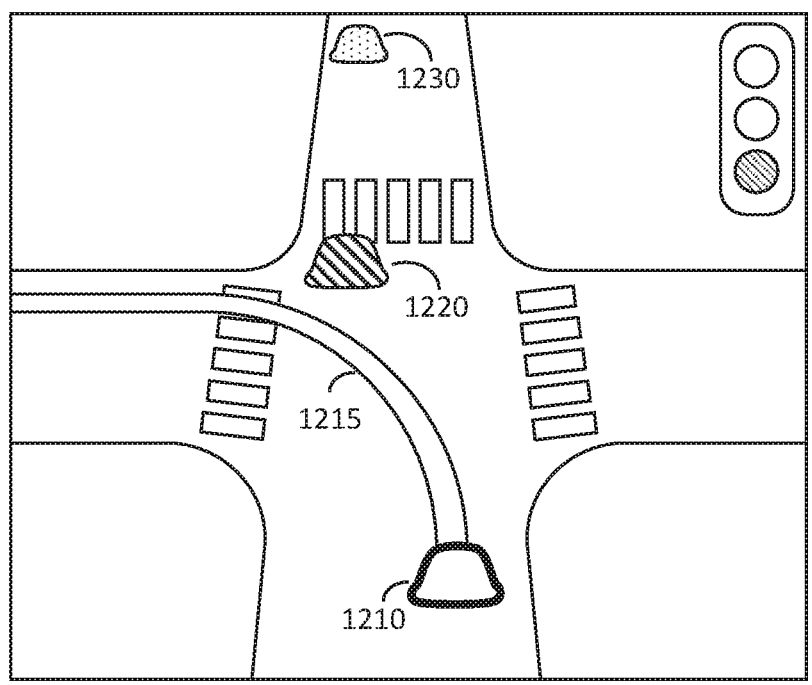
FIG. 12 is an example user interface illustrating visual coding of an asserting vehicle followed by a yielding vehicle according to some embodiments of the present disclosure.

FIG. 12 is an example user interface illustrating visual coding of an asserting vehicle followed by a yielding vehicle according to some embodiments of the present disclosure. The user interface includes an image 1210 of an AV 110 traveling along a roadway toward an intersection, an image of a planned pathway 1215 indicating that the AV 110 plans to turn left at the intersection, and images of two oncoming cars 1220 and 1230 in the environment of the AV 110. In this example, the first oncoming car 1220 is visually classified as an asserting object, and the second oncoming car 1230 is visually classified as yielding object. This indicates that the AV 110 plans to allow the first oncoming car 1220 to pass through the intersection, and then the AV 110 plans to turn left through the intersection ahead of the second oncoming car 1230.

Figure 13:
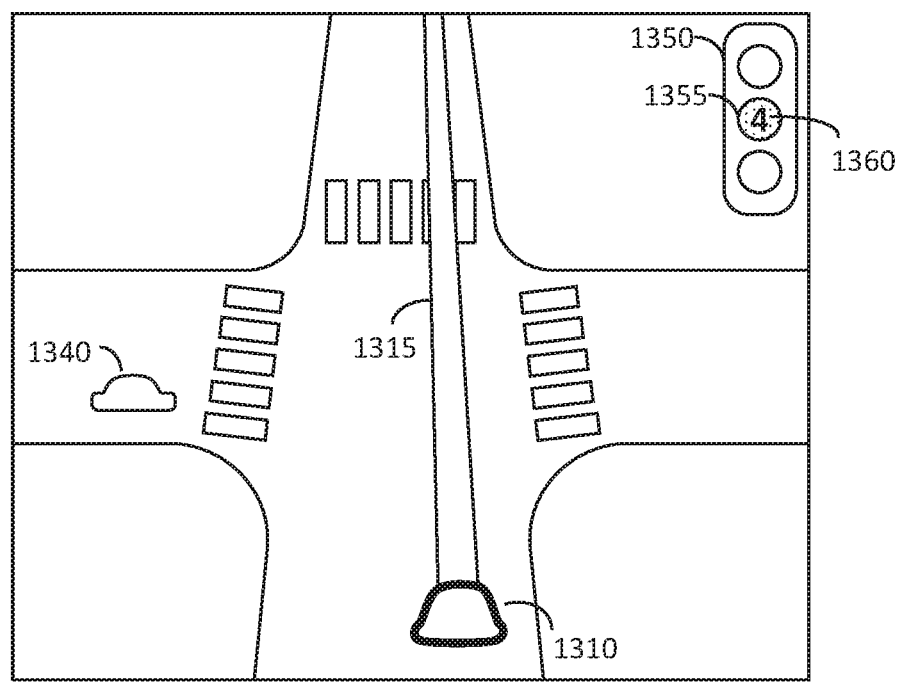
FIG. 13 is an example user interface illustrating a traffic light timer at a first time according to some embodiments of the present disclosure.

FIG. 13 is an example user interface illustrating a traffic light timer at a first time according to some embodiments of the present disclosure. The user interface includes an image 1310 of the AV 110 traveling along a roadway toward an intersection, an image of a planned pathway 1315 indicating that the AV 110 plans to continue straight through the intersection, and an image of another car 1340 in the environment of the AV 110. The user interface also includes a traffic light status indicator 1350, which is a depiction of a traffic light that highlights the current status of the traffic light, here by highlighting the yellow light 1355. The yellow light also includes a light timer 1360 that indicates a predicted remaining duration of the yellow light. Here, the light timer 1360 indicates that four seconds are remaining. The AV 110 may determine that the AV 110 can make it through the intersection in the four seconds before the light is predicted to turn red.

Figure 14:
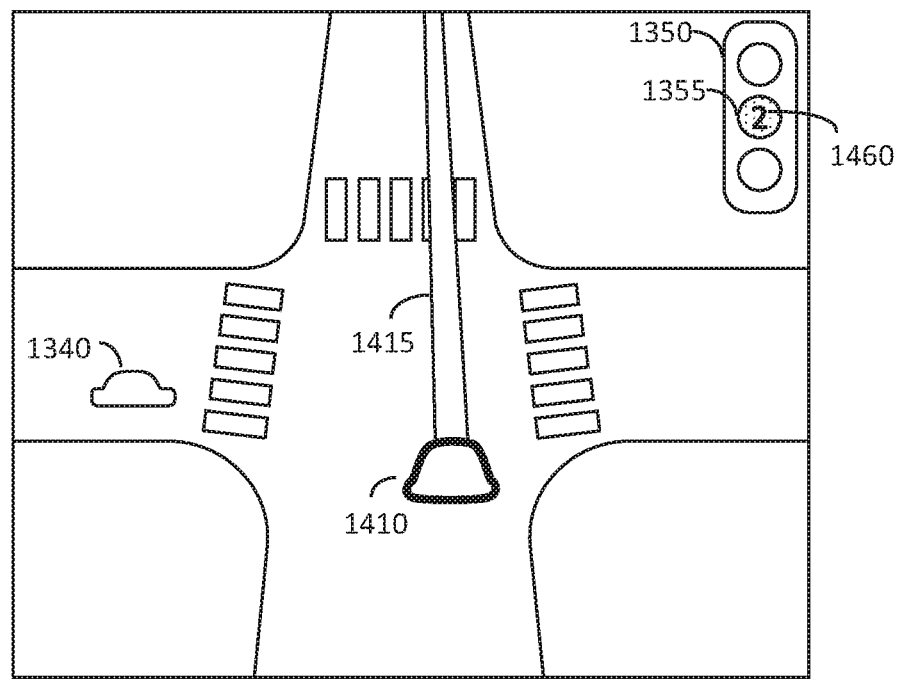
FIG. 14 is an example user interface illustrating a traffic light timer at a second time according to some embodiments of the present disclosure.

FIG. 14 is an example user interface illustrating the traffic light timer shown in FIG. 13 at a second time according to some embodiments of the present disclosure. In particular, the user interface shown in FIG. 14 is displayed two seconds after the user interface shown in FIG. 13 was displayed. The image 1410 of the AV 110 has moved closer to the intersection, and the image 1415 of the predicted pathway has been adjusted based on the current position of the AV 110. The light timer 1460 has updated to indicate that two seconds are remaining for the yellow light.

Figure 15:
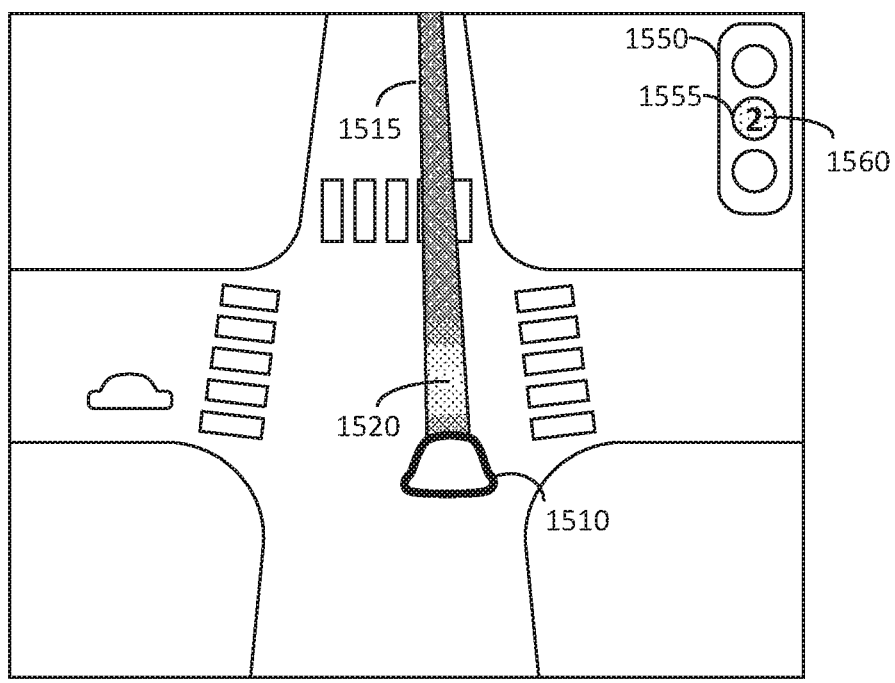
FIG. 15 is an example user interface illustrating planned velocities of an AV traveling through a yellow light according to some embodiments of the present disclosure.

FIG. 15 is an example user interface illustrating planned velocities of an AV traveling through a yellow light according to some embodiments of the present disclosure. The user interface includes an image 1510 of the AV 110 traveling along a roadway toward an intersection and an image of a planned pathway 1515 indicating that the AV 110 plans to continue straight through the intersection. The user interface also includes a traffic light status indicator 1550 with the yellow light 1555 highlighted and a light timer 1560 indicating that two seconds are predicted remaining for the yellow light. In this example, the AV 110 has determined that the AV 110 can make it through the intersection in the two seconds before the light is predicted to turn red. The image of the planned pathway 1515 indicates planned velocities of the AV 110 along the planned pathway using different shadings. In particular, a section 1520 of the planned pathway has a lighter shading than other sections; this indicates that the AV 110 plans to speed up as it travels into the intersection to ensure that it makes it through the intersection before the light changes to red. In this example, lighter shading corresponds to a faster velocity, and darker shading corresponds to a slower velocity. In other embodiments, different shading schemes, different colors, or other visual indications may be used to show speed.

Figure 16:
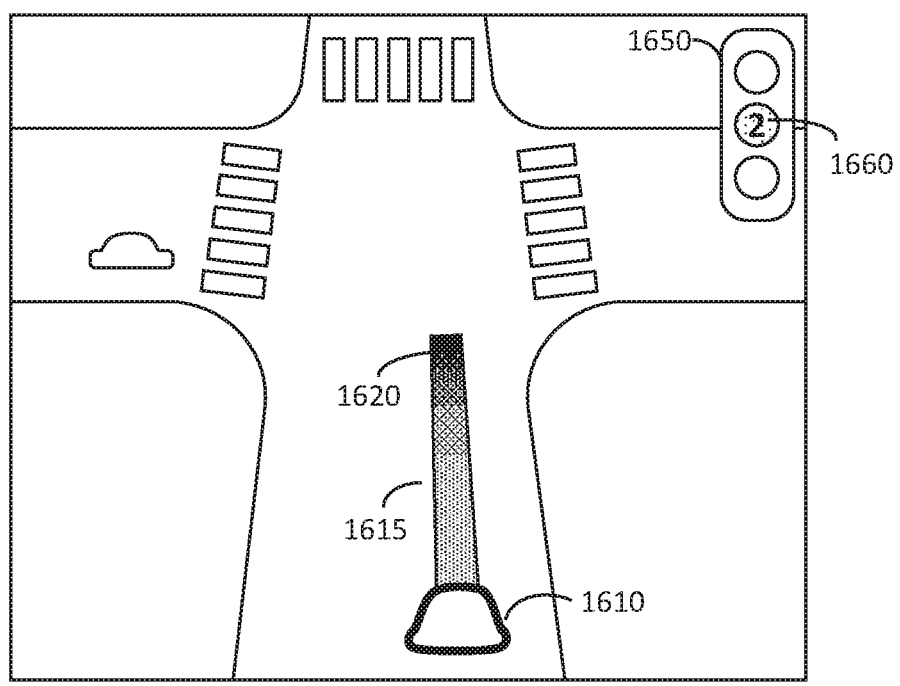
FIG. 16 is an example user interface illustrating planned velocities of an AV stopping at a traffic light according to some embodiments of the present disclosure.

FIG. 16 is an example user interface illustrating planned velocities of an AV stopping at a traffic light according to some embodiments of the present disclosure. In this example, the AV 110, depicted in the image 1610, is traveling toward the same intersection shown in FIG. 15, but the AV 110 is further away from the intersection with two seconds remaining of the yellow light, as indicated by the yellow light timer 1660 in the traffic light status indicator 1650. In this example, the image of the planned pathway 1615 is shaded to show that the AV 110 plans to stop at the intersection. In particular, the planned pathway 1615 gradually darkens in the direction of the intersection, until a section 1620 before the intersection that is dark, indicating that the AV 110 plans to stop at this point.

Note that the various features shown in FIGS. 9-16 can be included in any combination. For example, a user interface can include asserting and/or yielding visual characterizations, such as those shown in FIGS. 9-12, and velocity gradients, such as those shown in FIGS. 15 and 16, in the same interface. The user interface can include or omit the traffic light status indicator, e.g., the traffic light status indicator may be included when the AV 110 approaches a traffic light, and removed at other times.

Select Examples

Example 1 provides a method for visualizing planned behavior of an autonomous vehicle (AV) that includes receiving data describing a planned pathway of the AV along a roadway; receiving object data describing an object in an environment of the AV, the object associated with a predicted pathway crossing the planned pathway of the AV at a cross point; classifying the object as one of an asserting object and a yielding object based on a prediction of whether the object reaches the cross point before the AV or after the AV; and generating an image including the planned pathway of the AV and the object in the environment of the AV, where the image of the object indicates whether the object is classified as an asserting object or a yielding object.

Example 2 provides the method according to example 1, where in response to the object being an asserting object, the image of the object has a first visual characteristic, and in response to the object being a yielding object, the image of the object has a second visual characteristic different from the first visual characteristic.

Example 3 provides the method according to example 2, where the first visual characteristic is a first color, and the second visual characteristic is a second color.

Example 4 provides the method according to any of the preceding examples, where the object data includes predicted timing data along the predicted pathway, the planned pathway includes planned timing data along the planned pathway, and classifying the object includes determining, based on the predicted timing data and the planned timing data, whether the object is predicted to reach the cross point before the AV or after the AV.

Example 5 provides the method according to any of the preceding examples, where the method further includes identifying a rule for regulating the flow of traffic that governs the predicted pathway and the planned pathway, and predicting whether the object reaches the cross point before the AV or after the AV by applying the identified rule to the predicted pathway and the planned pathway.

Example 6 provides the method according to any of the preceding examples, where the method further includes receiving updated object data including an updated predicted pathway of the object; based on the updated object data, revising the classification of the object as an asserting object or a yielding object; and updating the image of the object to reflect the revised classification of the object.

Example 7 provides the method according to any of the preceding examples, where the data describing the planned pathway of the AV includes a plurality of velocities at a corresponding plurality of points along the planned pathway, and generating the image includes generating a color-coded pathway in which a color at a point along the color-coded pathway indicates a velocity at the corresponding point along the color-coded pathway.

Example 8 provides the method according to any of the preceding examples, where the method further includes receiving traffic light status data describing a current state of the traffic light and a predicted remaining duration of the current state of the traffic light in response to the AV approaching an intersection having a traffic light, and generating the image further includes generating a traffic light status indicator, the traffic light status indicator including a light timer indicating the predicted remaining duration.

Example 9 provides the method according to example 8, where the traffic light status data includes a predicted remaining duration of a yellow light, and the traffic light status indicator includes a light timer indicating the predicted remaining duration of the yellow light.

Example 10 provides a non-transitory computer-readable medium storing instructions for visualizing planned behavior of an autonomous vehicle (AV). The instructions, when executed by a processor, cause the processor to receive data describing a planned pathway of the AV along a roadway; receive object data describing an object in an environment of the AV, the object associated with a predicted pathway crossing the planned pathway of the AV at a cross point; classify the object as one of an asserting object and a yielding object based on a prediction of whether the object reaches the cross point before the AV or after the AV; and generate an image including the planned pathway of the AV and the object in the environment of the AV, where the image of the object indicates whether the object is classified as an asserting object or a yielding object.

Example 11 provides the computer-readable medium according to example 10, where in response to the object being an asserting object, the image of the object has a first visual characteristic, and in response to the object being a yielding object, the image of the object has a second visual characteristic different from the first visual characteristic.

Example 12 provides the computer-readable medium according to example 11, where the first visual characteristic is a first color, and the second visual characteristic is a second color.

Example 13 provides the computer-readable medium according any of examples 10 to 12, where the object data includes predicted timing data along the predicted pathway, the planned pathway includes planned timing data along the planned pathway, and classifying the object includes determining, based on the predicted timing data and the planned timing data, whether the object is predicted to reach the cross point before the AV or after the AV.

Example 14 provides the computer-readable medium according any of examples 10 to 13, where the instructions further cause the processor to identify a rule for regulating the flow of traffic that governs the predicted pathway and the planned pathway, and predict whether the object reaches the cross point before the AV or after the AV by applying the identified rule to the predicted pathway and the planned pathway.

Example 15 provides the computer-readable medium according any of examples 10 to 14, where the data describing the planned pathway of the AV includes a plurality of velocities at a corresponding plurality of points along the planned pathway, and generating the image includes generating a color-coded pathway in which a color at a point along the color-coded pathway indicates a velocity at the corresponding point along the color-coded pathway.

Example 16 provides the computer-readable medium according any of examples 10 to 15, where the instructions further cause the processor to receive traffic light status data describing a current state of the traffic light and a predicted remaining duration of the current state of the traffic light in response to the AV approaching an intersection having a traffic light, where generating the image further includes generating a traffic light status indicator, the traffic light status indicator including a light timer indicating the predicted remaining duration.

Example 17 provides a system for visualizing planned behavior of an autonomous vehicle (AV) including a path planning system configured to generate a planned pathway of the AV along a roadway; an object prediction engine configured to generate a predicted pathway of an object in an environment of the AV, the predicted pathway crossing the planned pathway of the AV at a cross point; and a user interface engine configured to classify the object as one of an asserting object and a yielding object based on a prediction of whether the object reaches the cross point before the AV or after the AV, and generate an image including the planned pathway of the AV and the object in the environment of the AV, where the image of the object indicates whether the object is classified as an asserting object or a yielding object.

Example 18 provides the system according to example 17, where in response to the object being an asserting object, the user interface engine generates the image of the object with a first visual characteristic, and in response to the object being a yielding object, the user interface engine generates the image of the object with a second visual characteristic different from the first visual characteristic.

Example 19 provides the system according to any of examples 17 and 18, where the path planning system is configured to generate a plurality of velocities at a corresponding plurality of points along the planned pathway, and the user interface engine is configured to generate a color-coded pathway in which a color at a point along the color-coded pathway indicates a velocity at the corresponding point along the color-coded pathway.

Example 20 provides the system according to any of examples 17 to 19, where the user interface engine is further configured to receive traffic light status data describing a current state of a traffic light and a predicted remaining duration of the current state of the traffic light, and generate a traffic light status indicator, the traffic light status indicator including a light timer indicating the predicted remaining duration.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A computer-implemented method for visualizing planned behavior of an autonomous vehicle (AV), the method comprising:

receiving data describing a planned pathway of the AV along a roadway, the data describing the planned pathway comprising a plurality of velocities of the AV at a corresponding plurality of points along the planned pathway;

receiving object data describing a pedestrian in an environment of the AV, the object data comprising a location of the pedestrian;

determining a predicted pathway of the pedestrian based on the location, the predicted pathway entering the roadway and crossing the planned pathway of the AV at a cross point along the roadway;

based on the data describing the planned pathway of the AV and the predicted pathway of the pedestrian, determining that the pedestrian is predicted to reach the cross point before the AV;

classifying the pedestrian as an asserting object in response to determining that the pedestrian is predicted to reach the cross point before the AV; and generating an image illustrating planned behavior of the AV and planned behavior of the pedestrian, the image comprising the planned pathway of the AV and the pedestrian in the environment of the AV, wherein the pedestrian in the image has a visual characteristic that indicates that the pedestrian is classified as an asserting object and that the pedestrian is predicted to reach the cross point before the AV.

2. The method of claim 1, wherein the object in the image has a first visual characteristic, the image further comprises a second object classified as a yielding object, and the second object has a second visual characteristic different from the first visual characteristic.

3. The method of claim 2, wherein the first visual characteristic is a first color, and the second visual characteristic is a second color.

4. The method of claim 1, further comprising:
identifying a rule for regulating flow of traffic that governs the predicted pathway and the planned pathway; and
predicting whether the object reaches the cross point before the AV or after the AV by applying the identified rule to the predicted pathway and the planned pathway.

5. The method of claim 1, further comprising:
receiving updated object data comprising an updated predicted pathway of the object;
based on the updated object data, revising the classification of the object a yielding object; and
updating the visual characteristic of the object in the image to reflect the revised classification of the object.

6. The method of claim 1, further comprising:
in response to the AV approaching an intersection having a traffic light, receiving traffic light status data describing a current state of the traffic light and a predicted remaining duration of the current state of the traffic light,
wherein generating the image further comprises generating a traffic light status indicator, the traffic light status indicator comprising a light timer indicating the predicted remaining duration.

7. The method of claim 6, wherein the traffic light status data comprises a predicted remaining duration of a yellow light, and the traffic light status indicator comprises a light timer indicating the predicted remaining duration of the yellow light.

8. The method of claim 1, wherein the predicted pathway is a first predicted pathway, the method further comprising:

determining a second predicted pathway of the pedestrian, the second predicted pathway not crossing the planned pathway of the AV at a cross point;

wherein the pedestrian is classified as an asserting object based on one of the first predicted pathway or the second predicted pathway crossing the planned pathway of the AV.

9. The method of claim 1, further comprising:
determining that the pedestrian is at a crosswalk; and
determining that the pedestrian is predicted to reach the cross point before the AV further based on the planned pathway intersecting the crosswalk, wherein the cross point is along the crosswalk.

10. The method of claim 9, further comprising:
receiving crosswalk signal data describing a crosswalk signal controlling movement of the pedestrian across the crosswalk; and
determining that the pedestrian is predicted to reach the cross point before the AV further based on based on the crosswalk signal data.

11. A non-transitory computer-readable medium storing instructions for visualizing planned behavior of an autonomous vehicle (AV), the instructions, when executed by a processor, cause the processor to:
receive data describing a planned pathway of the AV along a roadway, the data describing the planned pathway comprising a plurality of velocities of the AV at a corresponding plurality of points along the planned pathway;
receive object data describing a pedestrian in an environment of the AV, the object data comprising a location of the pedestrian;
determine a predicted pathway of the pedestrian based on the location, the predicted pathway entering the roadway and crossing the planned pathway of the AV at a cross point along the roadway;
based on the data describing the planned pathway of the AV and the predicted pathway of the pedestrian, determine that the pedestrian is predicted to reach the cross point before the AV;
classify the pedestrian as an asserting object in response to determining that the pedestrian is predicted to reach the cross point before the AV; and
generate an image illustrating planned behavior of the AV and planned behavior of the pedestrian, the image comprising the planned pathway of the AV and the pedestrian in the environment of the AV, wherein the pedestrian in the image has a visual characteristic that indicates that the pedestrian is classified as an asserting object and that the pedestrian is predicted to reach the cross point before the AV.

12. The non-transitory computer-readable medium of claim 11, wherein the object in the image has a first visual characteristic, the image further comprises a second object classified as a yielding object, and the second object has a second visual characteristic different from the first visual characteristic.

13. The non-transitory computer-readable medium of claim 12, wherein the first visual characteristic is a first color, and the second visual characteristic is a second color.

14. The non-transitory computer-readable medium of claim 11, wherein the instructions further cause the processor to:
identify a rule for regulating flow of traffic that governs the predicted pathway and the planned pathway; and
predict whether the object reaches the cross point before the AV or after the AV by applying the identified rule to the predicted pathway and the planned pathway.

15. The non-transitory computer-readable medium of claim 11, wherein the instructions further cause the processor to:
receive traffic light status data describing a current state of a traffic light and a predicted remaining duration of the current state of the traffic light in response to the AV approaching an intersection having a traffic light,
wherein generating the image further comprises generating a traffic light status indicator, the traffic light status indicator comprising a light timer indicating the predicted remaining duration.

16. A computer-implemented system for visualizing planned behavior of an autonomous vehicle (AV), the system comprising:
a path planning system configured to generate a planned pathway of the AV along a roadway, the planned pathway comprising a plurality of velocities of the AV at a corresponding plurality of points along the planned pathway;
an object prediction engine configured to:
receiving object data describing a pedestrian in an environment of the AV, the object data comprising a location of the pedestrian;
generate a predicted pathway of the pedestrian based on the location, the predicted pathway entering the roadway and crossing the planned pathway of the AV at a cross point along the roadway; and
based on the data describing the planned pathway of the AV and the predicted pathway of the pedestrian, determine that the pedestrian is predicted to reach the cross point before the AV; and
a user interface engine configured to:
classify the pedestrian as an asserting object in response to determining that the pedestrian is predicted to reach the cross point before the AV; and
generate an image illustrating planned behavior of the AV and planned behavior of the pedestrian, the image comprising the planned pathway of the AV and the pedestrian in the environment of the AV, wherein the pedestrian in the image has a visual characteristic that indicates that the pedestrian is classified as an asserting object and that the pedestrian is predicted to reach the cross point before the AV.

17. The system of claim 16, wherein the user interface engine generates the object in the image with a first visual characteristic, the image further comprises a second object classified as a yielding object, and the second object has a second visual characteristic different from the first visual characteristic.

18. The system of claim 16, wherein the user interface engine is further configured to:
receive traffic light status data describing a current state of a traffic light and a predicted remaining duration of the current state of the traffic light, and
generate a traffic light status indicator, the traffic light status indicator comprising a light timer indicating the predicted remaining duration.

19. The system of claim 16, wherein the object prediction engine is further configured to:
identify a rule for regulating flow of traffic that governs the predicted pathway and the planned pathway; and predict whether the object reaches the cross point before the AV or after the AV by applying the identified rule to the predicted pathway and the planned pathway.

20. The system of claim 16, wherein the user interface engine is further configured to:
- revise the classification of the object a yielding object based on an updated prediction from the object prediction engine; and
- update the visual characteristic of the object in the image to reflect the revised classification of the object.

\* \* \* \* \*